Patented Aug. 19, 1930

1,773,203

UNITED STATES PATENT OFFICE

RUDOLPH R. ROSENBAUM, OF CHICAGO, ILLINOIS

LUBRICANT AND PRODUCING PROCESS

No Drawing.  Application filed June 18, 1928. Serial No. 286,592.

My invention relates to a new product in the form of castor oil miscible with and soluble to any degree in hydro-carbons of the petroleum series and other oils with which it is not naturally miscible, and to an improved process for producing such soluble oil, and this application covers, in part, invention divided out of my original application Serial No. 205,848 filed July 14, 1927.

Castor oil, on account of its high viscosity and film stability is a very desirable ingredient for lubricating oils and compounds, but on account of its tendency to gum and its refusal to thoroughly mix in its natural state with petroleum or mineral oils, it cannot safely or efficiently be used until it has been treated to be thoroughly miscible and soluble.

Attempts have been made to obtain a mixture of castor oil with petroleum lubricating oils. In some of these prior processes a third ingredient is used. For example, rape seed oil has been used, and also cresylic acid, but when such lubricating compounds are used in an internal combustion engine, the third ingredient breaks down and burns up, so that the castor oil will then separate from the petroleum oil.

Another prior process has been to highly heat the castor oil at atmospheric or greater pressure to drive off a portion of the acids and aldehydes, the residue being thick and gummy. This residue is then blown to increase the gumminess and the viscosity, and the lubricating oil to which it is applied must therefore be of comparatively very low viscosity in order to obtain a lubricating product of the proper viscosity. I have found that such product will not last under heavy engine service as the low viscosity oil ingredient will soon burn up. I have also found that castor oil treated as above will not permanently mix in all proportions with lubricating oils, or mineral oils such as white oil, or medicinal oils such as those known under the trade names "Nujol", "Stanlax", "Russian mineral oil" or the like.

The important object of my invention is, therefore, to provide an improved process for making castor oil directly, perfectly, and permanently miscible in any proportion with petroleum lubricating oils and other oils like those referred to above, by removing the albuminous and gumming substances and other mixture preventing elements such as aldehydes, but without materially disturbing the viscosity and lubricating characteristics of the castor oil.

In accordance with my process, I put the castor oil to be treated into a kettle or other suitable heating vessel and add thereto a comparatively small quantity of a suitable distillation agent which, when the mass is heated under vacuum, will act upon, combine with, and assist to carry off from the oil the albuminous and gumming elements and aldehydes. Such agent may be a hydro-carbon of the petroleum series having a distillation temperature less than the temperature at which the castor oil will materially decompose, such as kerosene, white oil, or a low viscosity mineral lubricating oil, or it may be of vegetable origin, as, for example, turpentine. I have found that with the distillation agent forming about 10% of the mass, good results are obtained, although a little more or less could be used.

The kettle containing the mass is closed air tight and heated to a temperature ranging from about 550° F. to 650° F. depending upon the length of time it is subjected to the heat, and under vacuum in the kettle ranging from about 5 inches to 27 inches, depending upon the quantity of oil treated and the time of heating.

As a specific example good results are obtained from the following proportions and conditions: 200 gals. castor oil, 20 gals. kerosene, 25 inches vacuum, 600° Fahr. maximum temperature.

The oil and distillation agent may be put into the kettle cold and gradually brought up to the maximum temperature under the vacuum effect, and then held for a short time at maximum temperature, and is then allowed to gradually cool with the vacuum effect retained or gradually diminished until the temperature has fallen below 500° F. The entire process requires about 4 or 5 hours.

During heating of the mass under vacuum the distillation agent permeates and diffuses through the castor oil and becomes associated with the albuminous and gumming substances and aldehydes, and when the temperature reaches the distillation point of the distillation agent it begins to distill and carries these substances over with it, the remaining castor oil being perfectly and completely miscible in any proportion with petroleum hydro-carbon oils, and of itself, and in combination with other lubricating oils, forms a lubricant which will not gum. The process will not materially change the color of the castor oil or disturb its viscosity.

Ordinary commercial castor oil or chemically pure or medicinal castor oil, after treatment by my process will perfectly and permanently mix with medicinal oils such as are known under the trade names Nujol, Stanlax, Russian mineral oil, or the like.

I claim as follows:

1. The process of making castor oil soluble in mineral oil which consists in adding thereto a hydro-carbon distillation agent of comparatively low viscosity, and distilling the mass under less than atmospheric pressure at a temperature below that at which the castor oil will materially decompose.

2. The process of making castor oil soluble in mineral oil which consists in adding thereto a comparatively small quantity of hydro-carbon distillation agent whose distillation temperature is less than the temperature at which the castor oil will materially decompose, and then heating the mass under less than atmospheric pressure and to a temperature above the distillation point of the distillation agent but short of the temperature at which the castor oil will materially decompose.

3. The process of treating natural castor oil to make it soluble in petroleum hydrocarbons, which consists in heating it under vacuum in the presence of a hydro-carbon distillation agent to a temperature sufficiently high to distill off said agent and therewith part of the products of decomposition of the castor oil.

4. The process of treating natural castor oil to make it soluble in petroleum hydrocarbons, which consists in adding thereto a comparatively small quantity of a petroleum hydro-carbon of comparatively low viscosity, then heating the mass under vacuum to a temperature to cause the low viscosity hydrocarbon to distill off and assist in liberating and driving off the mixture preventing elements from said castor oil.

5. The process of treating natural castor oil to make it perfectly miscible with petroleum lubricating oils, which consists in adding thereto about 10% of a petroleum hydrocarbon whose distillation temperature is less than the temperature at which the castor oil will materially decompose, then heating the mass under vacuum of about 25 inches and to a temperature of about 600° F.

6. The process of making castor oil soluble in mineral oil which consists in adding thereto a small quantity of kerosene, and then heating the mass under less than atmospheric pressure and to a temperature above the distillation point of kerosene but short of the temperature at which the castor oil will materially decompose.

In witness whereof, I hereunto subscribe my name this 15th day of June, 1928.

RUDOLPH R. ROSENBAUM.